March 31, 1970
J. A. LYONS
3,504,278
BATHYTHERMOGRAPH TESTING APPARATUS
Filed March 12, 1968
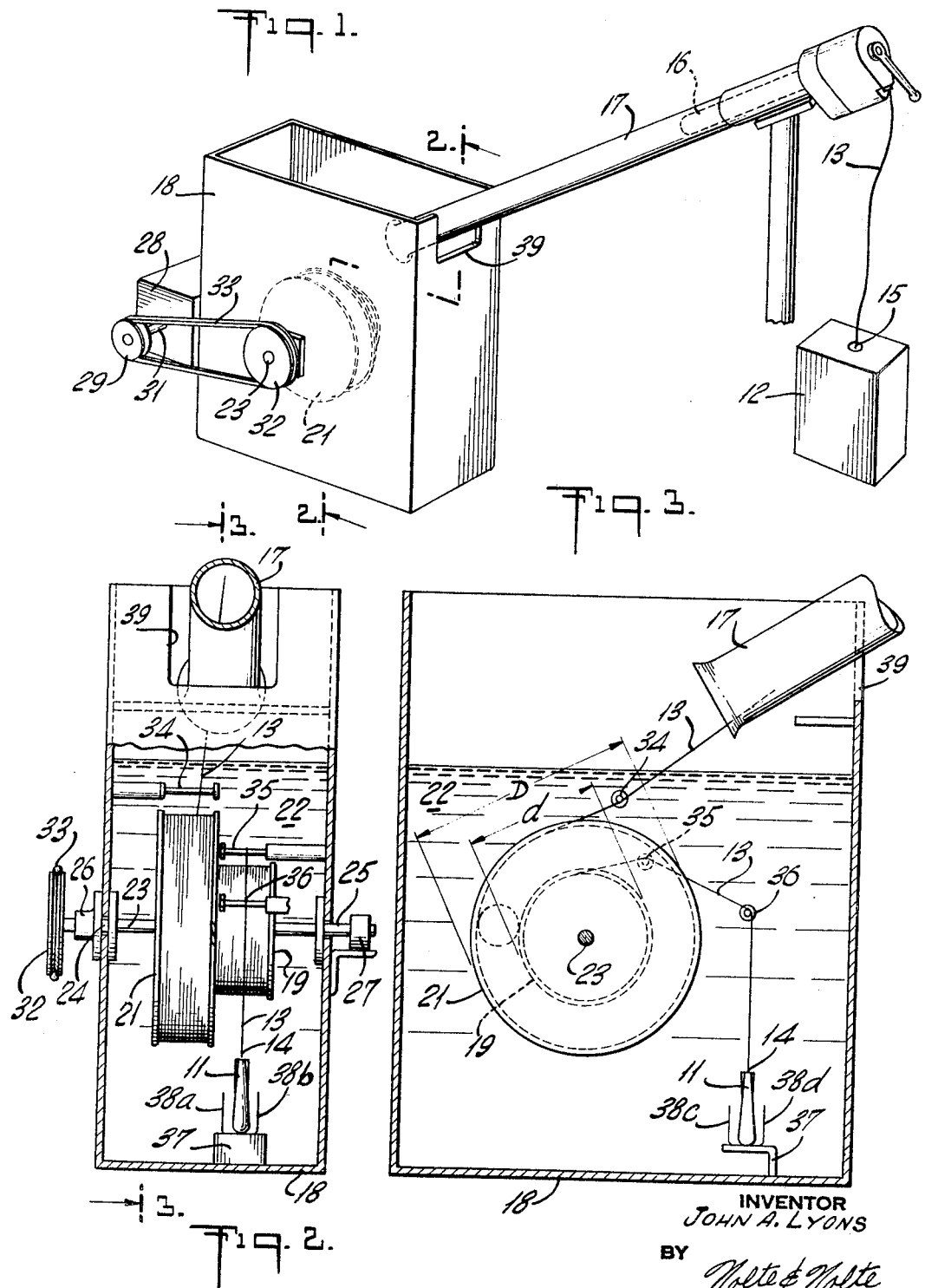
INVENTOR
JOHN A. LYONS
BY
Nolte & Nolte
ATTORNEYS

ABSTRACT OF THE DISCLOSURE

United States Patent Office 3,504,278
Patented Mar. 31, 1970

3,504,278
BATHYTHERMOGRAPH TESTING APPARATUS
John A. Lyons, Scituate, Mass., assignor to Buzzards Corporation, Marion, Mass., a corporation of Massachusetts
Filed Mar. 12, 1968, Ser. No. 712,544
Int. Cl. G01r 31/12
U.S. Cl. 324—54                            10 Claims

ABSTRACT OF THE DISCLOSURE

The probe and wire of a bathythermograph system to be tested are immersed in water in a test tank. The wire is mounted on a wire takeup reel in the tank and is maintained at a determined tension by a motor. The electrical indicator of the bathythermograph provides an indication which indicates a break in the wire, damage of the wire or a loss of insulation on part of the wire.

---

The present invention relates to a testing system. More particularly, the invention relates to apparatus for testing the wire and components of a bathythermograph system.

In a bathythermograph system of the type described in United States Patent No. 3,221,556, an expendable probe is deployed from a moving seagoing vessel containing electronic equipment to which the probe is electrically coupled via a wire. The probe may house a temperature measuring device, a pressure measuring device, a salinity measuring device, a second measuring device, a light measuring device, a density measuring device, etc. The probe deploys a great length of wire during its descent to the depths of the sea or body of fluid being tested. The bathythermograph probe includes a winding on which the wire is wound. The wire is of relatively small diameter and is covered with electrical insulation and is wound on another winding in a canister. The canister has electrical contacts which electrically connect the wire in the canister with shipboard electronic equipment. The end of the wire in the probe is electrically connected to the measuring device therein, such as a thermistor or sensing element.

The probe is lowered into the water and the wire is continuously and freely payed out from the winding provided in the canister positioned aboard ship to enable the ships to proceed without the need for compensation for the deployment of the probe. The wire on the winding in the probe is also continuously freely payed out through an opening in the probe to provide for little or no longitudinal stress in the wire during the descent of the bathythermograph probe. The combination of the winding in the probe and the winding in the canister aboard ship permits the bathythermograph probe to descend freely and the wire does not move in relation to the water. The wire is thus protected from breakage or damage and its speed relative to the water is substantially nil or zero. The insulation on the wire, or the wire itself, may, however, be damaged or destroyed during manufacture or transport to the vessel from which it is to be deployed. Since faults in the wire or faulty insulation on the wire distorts the electrical signal transmitted via said wire from the measuring device in the probe to the electronic equipment aboard the vessel, the electrical indication provided by such equipment would be inaccurate and the characteristics of the body of water sought to be determined would be inaccurately determined. It is, therefore, important that faults in the wire or in its insulation be discovered before the bathythermograph apparatus is placed in operation.

A principal object of the present invention is to provide new and improved apparatus for testing bathythermograph wire. The apparatus of the present invention indicates faults in bathythermograph wire or its insulation with rapidity, facility, efficiency, effectiveness and reliability. The apparatus of the present invention is of simple structure but sturdy. The apparatus of the present invention is inexpensive in manufacture and in operation. The apparatus of the present invention is easy to use and requires little or no maintenance or repair.

In accordance with the present invention, a tank is provided for containing water from the body of water of which a desired characteristic is to be measured. A mounting in the tank mounts the probe and the wire in the tank immersed in the water therein. A signal of the electrical indicator discloses a fault in the wire or the wire insulation. The mounting comprises a reel for the wire and a support shaft having ends supported by the tank walls for rotatably holding the reel. A drive motor is mechanically coupled to an end of the support shaft in a manner whereby a determined tension is maintained on the wire. Guides supported by the tank guide the wire from the probe to the wire reel and from the wire reel to the launching device. A platform affixed inside the tank maintains the probe completely surrounded by the water in the tank.

In order that the present invention may be readily carried into effect, it will now be described with reference to the accompanying drawings, wherein:

FIG. 1 is a perspective view of an embodiment of the apparatus of the present invention for testing wire of a bathythermograph;

FIG. 2 is a view, partly in section, taken along the lines 2—2 of FIG. 1; and

FIG. 3 is a view, partly in section, taken along the lines 3—3 of FIG. 2.

In the figures, the same components are identified by the same reference numerals.

A probe 11 (FIGS. 2 and 3) of a bathythermograph system comprises any suitable oceanographic research probe such as, for example, that described in United States Patent No. 3,221,556. The probe 11 houses a measuring device (not shown in the figures) for measuring temperature, pressure, salinity, sound, light or density, or other characteristics of the body of water in which said probe is immersed.

An electrical indicator 12 (FIG. 1) is separately mounted and may comprise any suitable electrical indicator such as, for example, the electronic measuring and recording system of United States Patent No. 3,221,556. The electrical indicator 12 functions to indicate an electrical signal from the measuring device of the probe 11. More particularly, the electrical indicator shows a desired characteristic or characteristics such as, for example, the amplitude of an electrical signal supplied to its input.

An electrically conductive wire 13 is electrically connected at one end 14 to the measuring device in the probe 11 and at the other end 15 to the electrical indicator 12. The wire 13 is of considerably great length, and, when in use, is found on a reel in the bathythermograph probe 11 and on another reel in the canister 16 (FIG. 1), which is contained within or formed with a launcher tube 17, the latter being utilized to deploy or launch said probe into the water, as described in the aforementioned United States patent. The wire 13 is of small diameter and is covered with electrical insulation.

The measuring device of the probe 11 remains electrically connected to the electrical indicator 12 when said probe is immersed in the body of water. Variations of an electrical characteristic in the measuring device of the probe 11 are sensed by the electrical indicator 12 which indicates such variations and thereby indicates the desired characteristic of the water being tested.

In accordance with the present invention, a tank 18 is provided. The probe 11 and the wire 13 are mounted in the tank 18, the wire on wire reels 19 and 21. The wire reels 19 and 21 are supported for rotation in the water 22 by a support shaft 23. The opposite ends 24 and 25 of the support shaft 23 are supported by the tank 18 by being passed through apertures formed in opposite sides of the tank. The apertures provided through the sides of the tank 18 to accommodate the ends of the support shaft, are provided with watertight seals to prevent the loss of water therethrough. The ends 24 and 25 of the support shaft 23 are housed in suitable bearings 26 and 27 (FIG. 2).

A drive motor 28 (FIG. 1) is mechanically coupled to the end 24 of the support shaft 23 via a pulley wheel 29 affixed to the motor shaft 31 (FIG. 1), a pulley wheel 32 affixed to said end of said support shaft and a drive belt 33 mounted on said pulley wheels. The drive motor 28 thus drives the wire reels 19 and 21 in the tank 18. The direction of rotation of the drive motor 28 and, therefore, of the pulley wheel 29 is such that a determined tension is maintained on the wire 13.

A plurality of guide rollers 34, 35 and 36 are supported in the tank 18 and function to guide the wire 13. Thus, the guide rollers 35 and 36 guide the wire 13 from the probe 11 to the wire reel 19 and the guide rollers 34 guide the wire 13 from the wire reel 21 to the launcher tube 17. A platform 37 is affixed to the tank 18 inside said tank. The probe 11 rests on the platform 37 and is, therefore, completely surrounded by the water 22 in the tank 18 so that actual operating conditions are simulated. Guard members 38a, 38b (FIG. 2), 38c and 38d (FIG. 3) extend from the top of the platform 37 to prevent the the probe 11 from slipping off said platform.

A notch 39 is cut out of one of the sides of the tank 18 at its upper edge. The launcher tube 17 is positioned in the notch 39 and is, thereby, supported and maintained in this position.

In accordance with the present invention, prior to the lowering of the probe 11 into the depths of the body of water to be tested, the wire 13, which links said probe to the shipboard electronic equipment, is tested in the test tank 18 in order to be assured of proper operating characteristics of elements of the system, such as the wire. The probe 11 and the wire 13 are immersed in the water 22 in the tank 18 and the drive motor 28 is rotated sufficiently to apply a desired determined tension to said wire so that actual deployment operating conditions are simulated. The wire 13 is first connected to the probe 11 and to the electrical indicator 12.

Thus, with the present invention, actual deployment conditions, such as on board a moving vessel, are simulated in that wire is freely withdrawn from the probe 11 and the canister, simultaneously. The wire is freely payed out from the spool within the probe as if it were descending in the ocean, and the wire is also freely payed out from the canister as if the canister were on board a vessel under way. The rates of withdrawal are proportional to the diameters D and d of reels 21 and 19, respectively since the angular speed of rotation of both reels is identical. It is the peripheral speed of the outer diameters of the reels that differ. Thus, the wire is taken up on reel 19 from probe 11 at a lower rate than the wire 13 from canister 16.

It is during this operation that flaws in the wire may be detected, such as pinholes in the insulation and breaks or cracks in the conductor.

While the invention has been described by means of specific examples and in a specific embodiment, we do not wish to be limited thereto, for obvious modifications will occur to those skilled in the art without departing from the spirit and scope of the invention.

What is claimed is:

1. Testing apparatus for simulating deployment conditions of a bathythermograph system for measuring a property of a fluid, said system including probe means having a sensing element for sensing a property of the fluid, a first conductor wound within the probe means, vehicle mounted means for deploying the probe including a housing and a second conductor wound within the housing, the apparatus comprising tank means containing fluid of the type said system is to measure, and reel means in said tank means for simultaneously withdrawing conductors from both the probe and the housing.

2. Testing apparatus according to claim 1 further comprising electrical means for indicating flaws in said conductors.

3. The testing apparatus according to claim 1 wherein said reel means comprises first and second reel portions positioned to withdraw said first and second conductors respectively from said probe and housing respectively, said first and second reel portions having diameters whereby upon rotation thereof the tension of said first and second conductors simulates the tensions of the conductors during said deployment conditions.

4. Apparatus for testing wire of a bathythermograph having a probe housing a measuring device for measuring a desired characteristic of a body of water, electrical indicating means for indicating an electrical signal from said measuring device, electrically conductive wire electrically connected to the measuring device at one end and to the electrical indicating means at the other end, said wire being covered with electrical insulation and being of great length so that said measuring device of the probe remains electrically connected to said electrical indicating means when said probe is immersed in fluid, said apparatus comprising tank means for containing fluid; and mounting means in said tank means for mounting said probe and said wire in said tank means immersed in the fluid whereby the indication of said electrical indicating means discloses a fault in said wire.

5. Apparatus as claimed in claim 4, wherein said mounting means comprises wire reel means for said wire and support means for rotatably supporting said wire reel means in said tank means.

6. Apparatus as claimed in claim 4, wherein said mounting means comprises wire reel means for said wire and support means for rotatably supporting said wire reel means in said tank means, and further comprising drive means coupled to said support means for driving said wire reel means in a manner whereby a determined tension is maintained on said wire.

7. Apparatus as claimed in claim 4, wherein said mounting means comprises a wire reel for said wire and a support shaft having ends supported by said tank means and supporting said wire reel for rotation, and further comprising a drive motor and coupling means mechanically coupling said drive motor to an end of said support shaft in a manner whereby a determined tension is maintained on said wire.

8. Apparatus as claimed in claim 7, further comprising guide means supported by said tank means in said tank means for guiding said wire from said probe to said wire reel and from said wire reel to said launching means.

9. Apparatus as claimed in claim 7, further comprising a platform affixed inside said tank means for maintaining said probe completely surrounded by the water in said tank means.

10. Apparatus as claimed in claim 8, further comprising a platform affixed inside said tank means for maintaining said probe completely surrounded by the water in said tank means.

References Cited

UNITED STATES PATENTS

| | | | |
|---|---|---|---|
| 1,938,684 | 12/1933 | Bond et al. | 324—54 |
| 3,217,246 | 11/1965 | Kallet et al. | 324—54 |
| 3,221,556 | 12/1965 | Campbell et al. | |
| 3,414,808 | 12/1968 | Thomas | 324—54 |

LOUIS R. PRINCE, Primary Examiner

H. C. POST III, Assistant Examiner

U.S. Cl. X.R.

73—1